US 6,665,145 B2

(12) United States Patent
Wada

(10) Patent No.: US 6,665,145 B2
(45) Date of Patent: Dec. 16, 2003

(54) MAGNETIC RECORDING MEDIUM WITH UNIT MINUTE RECORDING PORTIONS

(75) Inventor: Yoshimitsu Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/500,910

(22) Filed: Feb. 9, 2000

(65) Prior Publication Data

US 2002/0135939 A1 Sep. 26, 2002

(30) Foreign Application Priority Data

Feb. 10, 1999 (JP) .......................................... 11-033242

(51) Int. Cl.⁷ .............................. G11B 23/03; G11B 5/82
(52) U.S. Cl. ........................................ 360/133; 360/135
(58) Field of Search ................................ 360/135, 133, 360/131

(56) References Cited

U.S. PATENT DOCUMENTS

| | | | | |
|---|---|---|---|---|
| 5,285,343 A | * | 2/1994 | Tanaka et al. | 360/131 |
| 5,703,733 A | * | 12/1997 | Suzuki et al. | 360/77.01 |
| 5,820,769 A | * | 10/1998 | Chou | 360/131 |
| 6,171,676 B1 | * | 1/2001 | Mukai et al. | 428/65.3 |
| 6,259,575 B1 | * | 7/2001 | Thomas, III et al. | 360/60 |
| 6,351,339 B1 | * | 2/2002 | Bar-Gadda | 360/55 |

FOREIGN PATENT DOCUMENTS

| | | |
|---|---|---|
| JP | 2-156417 | 6/1990 |
| JP | 5-234070 | 9/1993 |
| JP | 09297918 | * 11/1997 |

OTHER PUBLICATIONS

U.S. patent application Ser. No. 09/500,544, filed Feb. 9, 2000, pending.
U.S. patent application Ser. No. 09/500,910, filed Feb. 9, 2000, pending.

* cited by examiner

*Primary Examiner*—Julie Anne Watko
(74) *Attorney, Agent, or Firm*—Oblon, Spivak, McClelland, Maier & Neustadt, P.C.

(57) ABSTRACT

In conjunction with a so-called patterned medium including recording tracks each having an array of unit minute recording portions of a magnetic material separated by non-recording portions of a nonmagnetic material, a magnetic head slider is prevented from sticking to the medium. The magnetic recording medium includes recording tracks each having an array of unit minute recording portions of a magnetic material separated by non-recording portions of a nonmagnetic material. The surface height of the unit minute recording portions is set higher than the surface height of the non-recording portions.

13 Claims, 4 Drawing Sheets

MAGNETIC RECORDING MEDIUM WITH UNIT MINUTE RECORDING PORTIONS

BACKGROUND OF THE INVENTION

1. Technical Field

This invention relates to a magnetic recording medium, more particularly, to a magnetic recording medium for use in magnetic read/write equipment such as magnetic disk equipment known as hard disk drives (HDD), and further particularly, to the structure of a magnetic recording medium having a high recording density.

2. Background Art

High-capacity storage devices, especially hard disk drives featuring a high data transfer rate, quick access, high reliability and low price have marked a significant advance toward higher capacity and higher density. An improvement in areal recording density is accomplished by miniaturizing recording magnetic domains formed in the magnetic recording layer. At present, the density has exceeded 5 gigabits per square inch, with development efforts being made with the target on 10 gigabits to 100 gigabits.

Used as the magnetic head for write and read operation is a combined magnetic head in which an inductive head as the write head is combined with a magnetoresistive head (MR head) as the read head, which are mounted on a slider. Since the output of the MR head is determined by a magnetic flux change per circumferential unit length, in principle, the output does not decline even when the track width is minimized. The use of the MR head thus suggests a possibility to realize narrow tracks. The same applies to a giant magnetoresistive head (GMR head) with which a higher recording density is expected.

However, if the track width is too narrow, the interference or crosstalk between magnetic signals from adjacent recording tracks increases so that the degradation of read signals becomes a problem.

The areal recording density can also be increased by reducing the recording bit length. If the recording bit length is too short, the interference or partial erasure between magnetic signals from adjacent bits increases so that the degradation of read signals becomes a problem.

JP-A 9-297918 discloses a magnetic recording medium in which a plurality of recording portions are provided in the form of rectangular regions having two side lengths equal to a track width and a minimum bit-determining length, the plurality of recording portions are separated by space areas, and information is stored in the recording portions. This medium is a so-called patterned medium. The patterned medium is effective for suppressing the degradation of read signals by crosstalk and partial erasure.

A magnetic disk device utilizing the contact-start-and-stop (CSS) system has the risk that the slider of the magnetic head, which is in contact with the magnetic disk at rest, can stick to the disk at start-up to disrupt the recorded information. To prevent the sticking of the slider is an outstanding problem.

For preventing the slider sticking phenomenon from occurring in the magnetic disk device of the CSS system, it is contemplated effective to provide the disk surface with minute protrusions and depressions. Such minute protrusions and depressions reduce the contact area of the disk surface with the slider, reducing the sticking force.

For example, JP-A 2-156417 describes that a coating layer of a gel containing inorganic particles having a large particle size and inorganic particles having a small particle size is formed on a substrate before a magnetic layer is formed thereon. Those particles having a large particle size protrude from the coating layer to provide the magnetic disk surface with protrusions and depressions, preventing the slider from sticking thereto.

Also, JP-A 5-234070 proposes a medium having protrusions on its surface wherein an alumilite coating is formed on the surface of a substrate, the alumilite coating is treated with a fluorine-containing solution or gas, or a solution selected from among acids, bases, and salts of strong acids, and a magnetic film is then formed.

As discussed above, the prior art requires to employ an independent step for providing the medium surface with protrusions and depressions, resulting in a drop of productivity. For the patterned medium, effective means for preventing the slider from sticking to the medium has not been proposed.

SUMMARY OF THE INVENTION

In conjunction with a so-called patterned medium comprising recording tracks each having an array of unit minute recording portions of a magnetic material separated by non-recording portions of a nonmagnetic material, an object of the invention is to prevent a magnetic head slider from sticking to the medium.

This and other objects are attained by the present invention which is defined below.

(1) A magnetic recording medium comprising recording tracks each having an array of unit minute recording portions of a magnetic material separated by non-recording portions of a nonmagnetic material, the unit minute recording portions having a higher surface height than the non-recording portions.

(2) The magnetic recording medium of (1) wherein the surface height of the unit minute recording portions is 5 to 30 nm higher than the surface height of the non-recording portions.

(3) The magnetic recording medium of (1) wherein each unit minute recording portion is a single magnetic domain.

(4) The magnetic recording medium of (1) wherein the unit minute recording portions are constructed of any one of Co, Co—Cr, Co—Cr—Ta and Co—Cr—Pt.

OPERATION AND BENEFITS

Since the surface height of the unit minute recording portions is set higher than the surface height of the non-recording portions according to the invention, the unit minute recording portions and non-recording portions form protrusions and depressions which prevent the slider from sticking to the medium. The invention eliminates a need for an extra step for providing the medium surface with depressions and protrusions.

DESCRIPTION OF THE PREFERRED EMBODIMENTS

Figure 1:
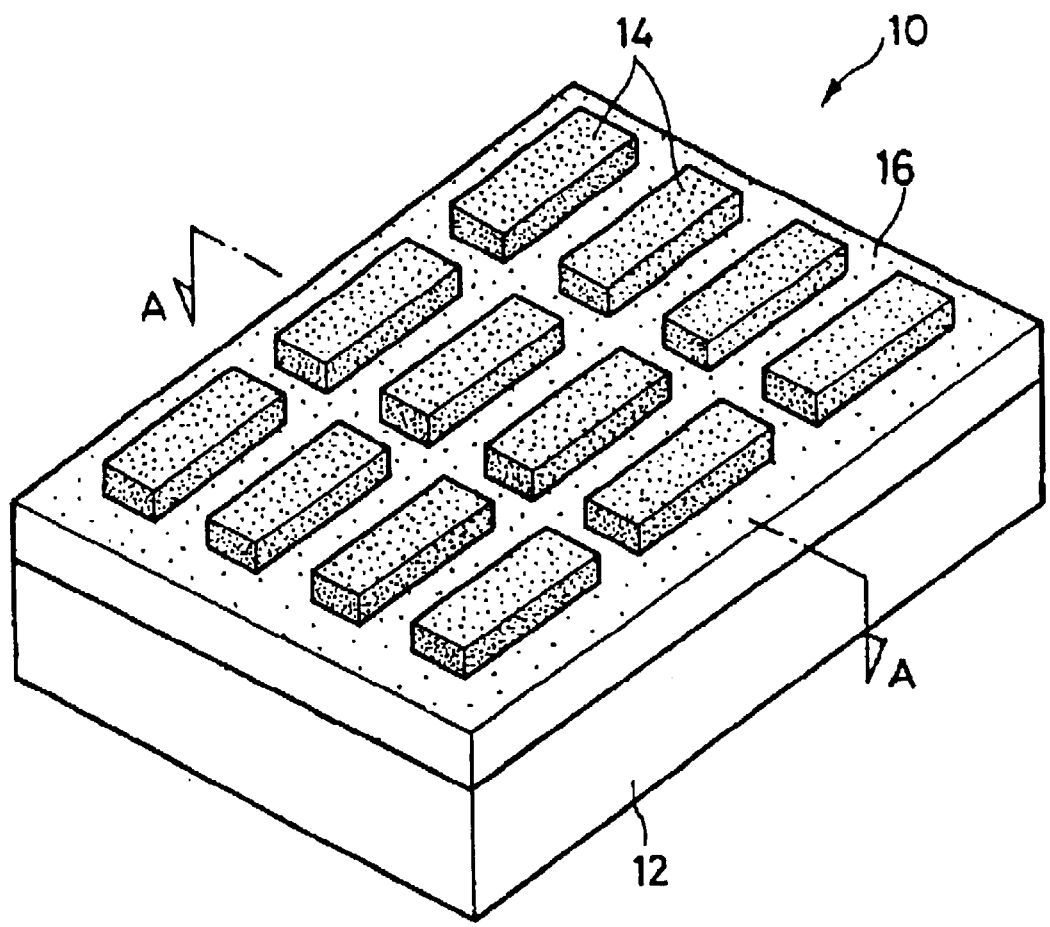
FIG. 1 is an enlarged perspective view of a portion of a magnetic recording medium according to one embodiment of the invention.
Figure 2:
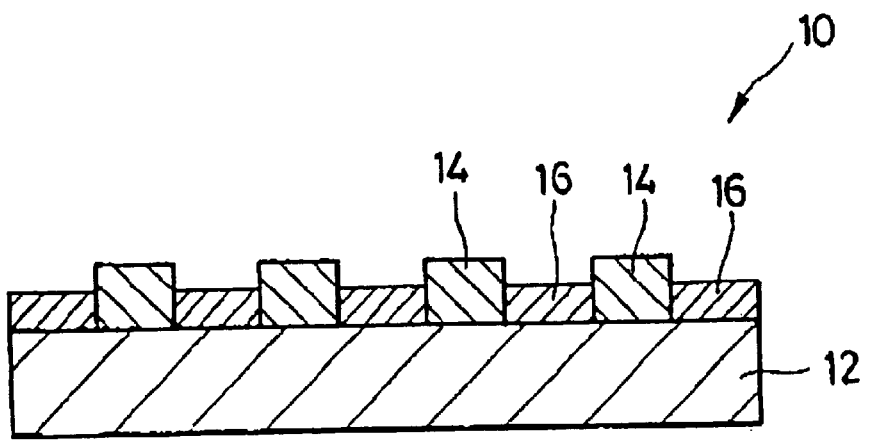
FIG. 2 is a cross-sectional view of the magnetic recording medium taken along lines A—A in FIG. 1.

The invention is mainly applied to magnetic disk media. Referring to FIG. 1, a magnetic disk medium according to one embodiment of the invention is shown in perspective view.

The magnetic disk medium 10 illustrated in FIG. 1 includes a disk-shaped substrate 12 and has a plurality of unit minute recording portions 14 arranged on the substrate in a concentric or spiral pattern and circumferentially and radially spaced apart from each other, and non-recording portions 16 intervening between adjacent unit minute recording portions 14. The unit minute recording portions 14 are constructed of a magnetic material capable of magnetically recording information whereas the non-recording portions 16 are constructed of a nonmagnetic material. Since the unit minute recording portions 14 are almost completely magnetically isolated from each other, the crosstalk or partial erasure between adjacent unit minute recording portions is prevented.

According to the invention, the surface height of the unit minute recording portions 14 is set higher than the surface height of the non-recording portions 16. Namely, the surface of unit minute recording portions 14 is protruded relative to the surface of the non-recording portions 16. Since microscopic raised and depressed portions are present on the medium surface, the medium of the invention prevents the slider from sticking to the medium surface.

The distance of protrusion of the surface of unit minute recording portions 14 relative to the surface of non-recording portions 16, that is, the difference in surface height therebetween is preferably 5 to 30 nm, more preferably 10 to 30 nm, and most preferably 10 to 20 nm. A too small protrusion distance may compromise the benefits of the invention. It is difficult to manufacture a medium having a large protrusion distance outside the range.

Preferably each unit minute recording portion 14 has a single magnetic domain structure. The single magnetic domain structure permits the size of crystal grains of which the unit minute recording portion is constructed to be increased, which is effective for restraining the degradation of magnetization by thermal disturbances. The single magnetic domain structure also permits the switching speed of magnetization to be accelerated.

The shape of unit minute recording portions 14 is not critical although a shape having a major axis and a minor axis is preferred. A rectangular shape as shown in FIG. 1 is one example while a shape obtained by cutting an ellipsoid of revolution into substantially equal halves is also acceptable. In order to increase the bit density and produce sufficient outputs, the unit minute recording portions 14 are preferably configured to a shape having major and minor axes and arranged such that the major axis may be parallel to the track width direction (disk radial direction) and the minor axis be parallel to the track longitudinal direction (disk circumferential direction).

The dimensions of unit minute recording portions 14 are not critical although it is preferred that the major axis have a length of about 0.1 to 1.0 $\mu$m, the minor axis have a length of about 0.05 to 0.5 $\mu$m, and the thickness be about 10 to 100 nm.

The magnetic material of which the unit minute recording portions 14 are constructed is not critical. The preferred materials are Co, Ni, Fe, and alloys containing at least one of these elements, with Co, Co—Cr, Co—Cr—Ta or Co—Cr—Ti being especially preferred. It is noted that the invention is applicable to either longitudinally magnetizable media or perpendicularly magnetizable media.

Figure 3:
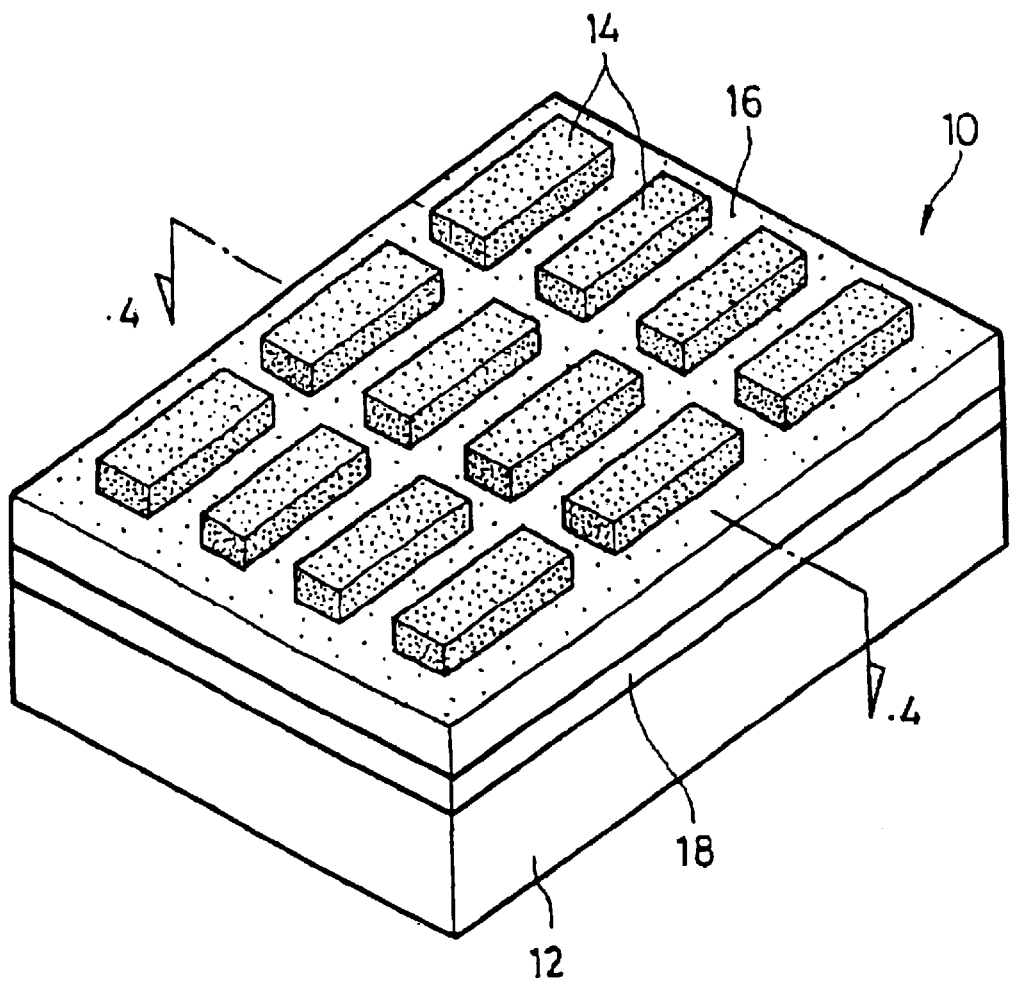
FIG. 3 is an enlarged perspective view of a portion of a magnetic recording medium according to another embodiment of the invention.
Figure 4:
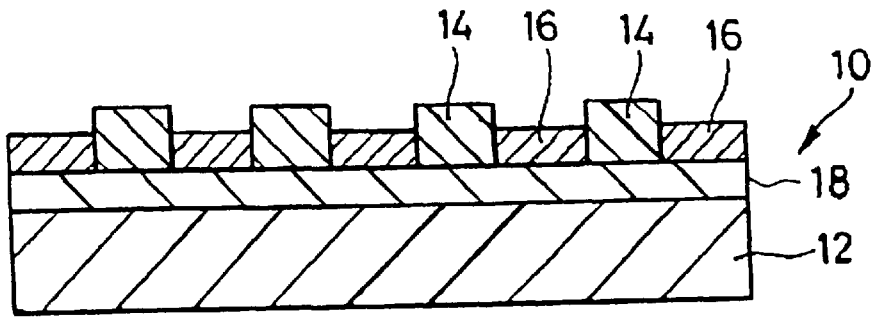
FIG. 4 is a cross-sectional view of the magnetic recording medium taken along lines B—B in FIG. 3.

In the magnetic recording medium of the invention, as shown in FIGS. 3 and 4, a back layer 18 for controlling orientation may be formed between the substrate 12 and the unit minute recording portions 14 and contiguous to the unit minute recording portions 14. The composition of the back layer 18 may be suitably determined in accordance with the material of the unit minute recording portions 14 such that the desired orientation is obtained. For example, in the case of a longitudinally magnetizable medium wherein the unit minute recording portions 14 are constructed of the above-mentioned Co—Cr base magnetic material, the back layer 18 is preferably constructed of any one of Ti, Ru, Ge, Zr and Cr. When the invention is applied to a perpendicularly magnetizable medium, a soft magnetic back layer is usually formed between the substrate 12 and the unit minute recording portions 14.

Further, like prior art media, a protective layer or lubricating layer may be provided on the medium surface to protect the medium surface from contact with the magnetic head. The protective layer may be formed, for example, of carbon or $SiO_2$ and by sputtering or the like. The lubricating layer may be formed of well-known lubricants and by spin coating or the like.

The nonmagnetic material of which the non-recording portions 16 are constructed is selected, for example, from oxides such as $SiO_2$, $Al_2O_3$ and $TiO_2$, nitrides such as $Si_3N_4$, AlN and TiN, carbides such as TiC, borides such as BN, and polymers of C, CH and CF systems.

The substrate 12 may be constructed of conventional magnetic disk substrate materials such as aluminum alloys, glass and silicon. The substrate 12 usually has a thickness of about 500 to 1,000 $\mu$m.

Next, referring to FIGS. 5(a)–5(g), one exemplary method for preparing the magnetic recording medium of the invention is described.

Figure 5A:
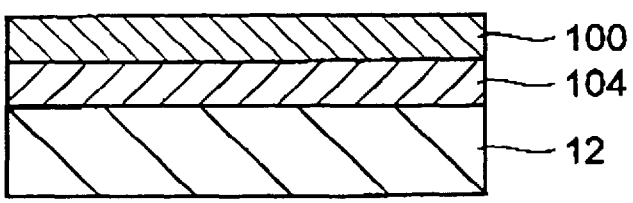
FIGS. 5(a)–5(g) illustrate in cross-sectional view the steps of one exemplary method for preparing the magnetic recording medium of the invention.

In this method, as shown in FIG. 5(a), a magnetic material 104 is first deposited on a substrate 12 by sputtering or the like, and a photoresist layer 100 is then formed thereon by coating.

Figure 5B:
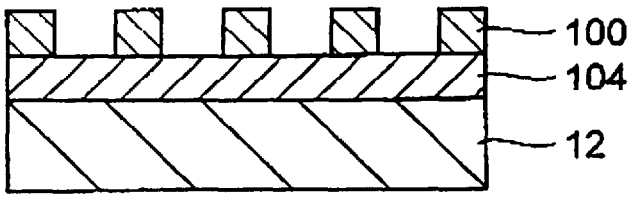

Then, the photoresist layer 100 is patterned by photolithography to a shape as shown in FIG. 5(b). In depressions defined by this patterning, the photoresist is completely removed and the surface of the magnetic material 104 is exposed. In the practice of photolithography, use may be made of exposure through a mask, exposure using a laser capable of controlling the position of irradiation, and exposure using an electron beam tube.

Figure 5C:
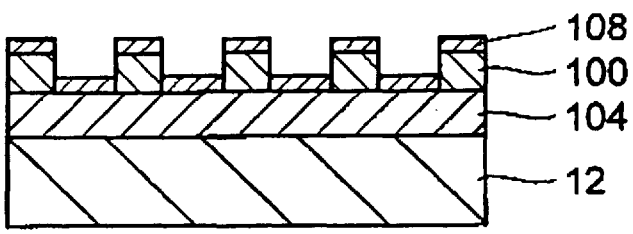

Then, a mask material 108 is deposited on the photoresist layer 100 and the exposed surface of the magnetic material 104 by sputtering or the like as shown in FIG. 5(c). The mask material 108 is to form a mask against dry etching such as reactive ion etching (RIE) and is composed, for example, of Cr or Ti.

Figure 5D:
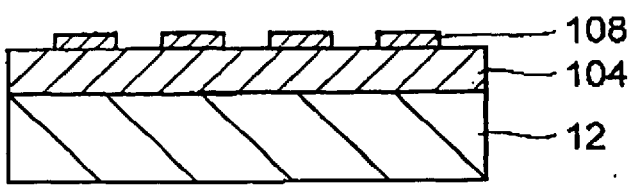
Figure 5E:
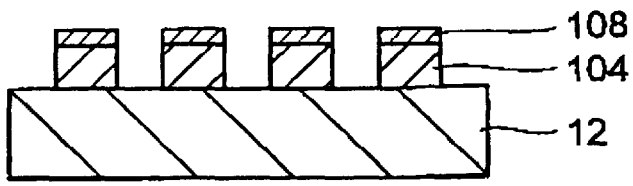
Figure 5F:
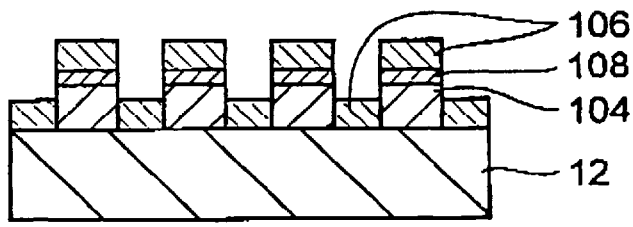
Figure 5G:
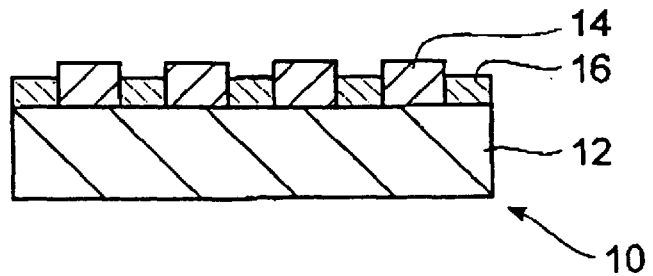
Figure 6A:
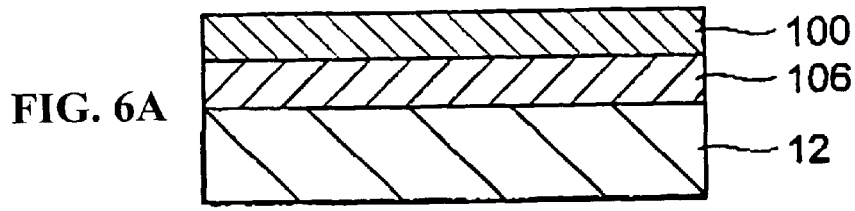
FIGS. 6(a)–6(e) illustrate in cross-sectional view the steps of a another exemplary method for preparing the magnetic recording medium of the invention.
Figure 6B:
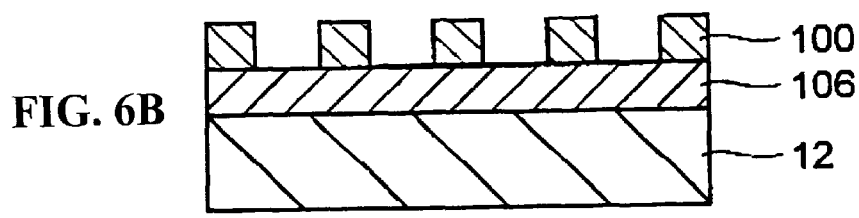
Figure 6C:
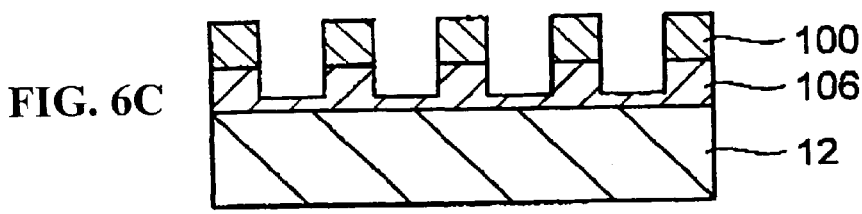
Figure 6D:
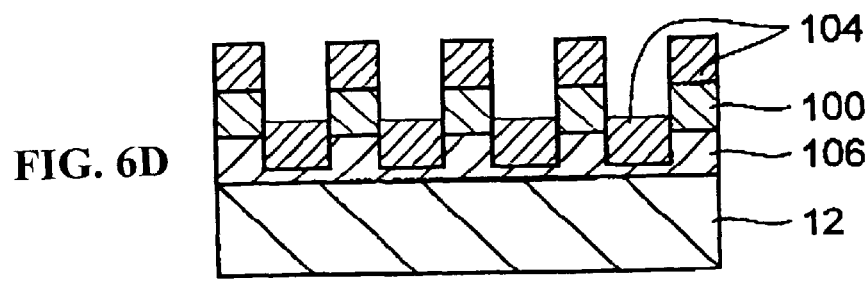
Figure 6E:
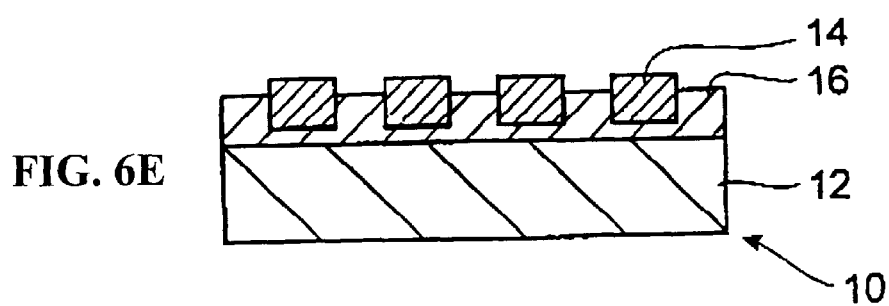

Then, the photoresist layer 100 is removed by a resist remover liquid, with the mask material 108 overlying the photoresist layer being simultaneously removed. As a consequence, only the mask material 108 deposited on the surface of the magnetic material 104 is left behind as shown in FIG. 5(d). Note that the resist remover liquid used herein may be acetone or MEK, for example.

Then, using the mask material 108 as a mask, the magnetic material 104 is etched by RIE or the like, thereby exposing the surface of the substrate 12 as shown in FIG. 5(*e*).

Then, a nonmagnetic material 106 is deposited on the magnetic material 104 and the exposed surface of the substrate 12 by sputtering or the like, giving a structure as shown in FIG. 5(*f*). Subsequently, the mask material 108 and nonmagnetic material 106 deposited on the magnetic material 104 are removed by chemical and mechanical polishing. This results in a magnetic disk medium 10 in which the surface height of unit minute recording portions 14 is higher than the surface height of non-recording portions 16 as shown in FIG. 5(*g*). It is noted that the deposition thickness of the nonmagnetic material 106 in FIG. 5(*f*) is selected such that the difference between the surface height of unit minute recording portions 14 and the surface height of non-recording portions 16 may become the desired value at the end of chemical and mechanical polishing.

Next, referring to FIGS. 6(*a*)–6(*e*), another exemplary method for preparing the magnetic recording medium of the invention is described.

In this method, as shown in FIG. 6(*a*), a nonmagnetic material 106 is first deposited on a substrate 12 by sputtering or the like, and a photoresist layer 100 is then formed thereon by coating.

Then, the photoresist layer 100 is patterned by photolithography to a shape as shown in FIG. 6(*b*). In depressions defined by this patterning, the photoresist is completely removed and the surface of the nonmagnetic material 106 is exposed.

Then, using the photoresist layer 100 as a mask, the nonmagnetic material 106 is etched by RIE or the like. At this point, the etching of the nonmagnetic material 106 may be effected to only a part of its height as shown in FIG. 6(*c*) or continued until the surface of the substrate 12 is exposed.

Then, a magnetic material 104 is deposited on the exposed surface of the nonmagnetic material 106 and the photoresist layer 100 by sputtering or the like, giving a structure as shown in FIG. 6(*d*). Subsequently, the photoresist layer 100 is removed by a resist remover liquid, with the magnetic material 104 overlying the photoresist layer being simultaneously removed. This results in a magnetic disk medium 10 in which the surface height of unit minute recording portions 14 is higher than the surface height of non-recording portions 16 as shown in FIG. 6(*e*). It is noted that the deposition thickness of the magnetic material 104 in FIG. 6(*d*) is selected such that the difference between the surface height of unit minute recording portions 14 and the surface height of non-recording portions 16 may become the desired value.

EXAMPLE

A combined magnetic head was fabricated by mounting a write head and a read head on a 30% slider which was made of AlTiC ($Al_2O_3$—TiC) to dimensions of 1.235 mm longitudinal, 1.0 mm transverse and 0.3 mm high and a weight of 1.5 mg. The write head used was an inductive head having a magnetic pole width of 0.1 µm and a gap distance of 0.2 µm, and the read head used was a MR head.

A magnetic disk medium was fabricated by the method shown by the flow diagram of FIG. 5. The unit minute recording portions 14 were rectangular and their dimensions were 0.2 µm in the transverse direction of recording tracks, 0.1 µm in the longitudinal direction of recording tracks, and 40 nm thick. The dimensions of spaces between adjacent unit minute recording portions 14, that is, the dimensions of non-recording portions 16 were 0.16 µm in the transverse direction of recording tracks, 0.08 µm in the longitudinal direction of recording tracks, and the non-recording portions 16 were 20 nm thick. Consequently, the protrusion distance of the surface of unit minute recording portions 14 relative to the surface of non-recording portions 16 was 20 nm. The track pitch was 0.36 µm (70 kTPI) and the bit pitch was 0.18 µm (141 kBPI). This recording density corresponds to 10 $Gb/in^2$.

Note that unit minute recording portions 14 had a single magnetic domain structure of cobalt with a coercivity (Hc) of 750 Oe and an axis of easy magnetization being aligned with the longitudinal direction of recording tracks. The non-recording portions 16 were constructed of carbon.

On the magnetic disk medium, signals were recorded by means of the combined magnetic head. The rotational speed of the magnetic disk medium was 10,000 rpm and the flying height of the slider was 25 nm. After recording, the magnetized state of the magnetic disk medium was observed under a magnetic force microscope (MFM) to find that unit minute recording portions had been magnetized in accordance with recording signals.

A comparative medium was fabricated as was the above magnetic disk medium except that both the unit minute recording portions 14 and the non-recording portions 16 were 20 nm thick, that is, had the same surface height. Note that in the comparative medium, a conventional texture treatment was effected on the substrate surface in order to prevent the slider from sticking to the medium surface.

With the rotational speed of the medium and the flying height of the magnetic head set as above, a contact-start-and-stop (CSS) test was repeated 50,000 cycles on the inventive medium and comparative medium. As a result, the disruption of the recorded information by the sticking of the slider to the medium was not ascertained in either of the media.

The effectiveness of the invention is evident from the foregoing Example.

What is claimed is:

1. A magnetic recording medium comprising:
   a substrate;
   recording tracks each having an array of unit minute recording portions of a magnetic material formed on said substrate and separated by non-recording portions of a solid nonmagnetic material also formed on said substrate,
   said unit minute recording portions having a higher surface height than said non-recording portions, such that the surface height of said unit minute recording portions is 5 to 30 nm higher than the surface height of said non-recording portions.

2. The magnetic recording medium of claim 1, wherein the surface height of said unit minute recording portions is 10 to 20 nm higher than the surface height of said non-recording portions.

3. The magnetic recording medium of claim 1, wherein each said unit minute recording portion is a single magnetic domain.

4. The magnetic recording medium of claim 1, wherein said unit minute recording portions are constructed of any one of Co, Co—Cr, Co—Cr—Ta, and Co—Cr—Pt.

5. The magnetic recording medium of claim 1, wherein said unit minute recording portions have surfaces all at a same height.

6. The magnetic recording medium of claim 5, wherein the surface height of said unit minute recording portions is 10 to 20 nm higher than the surface height of said non-recording portions.

7. The magnetic recording medium of claim 5, wherein each said unit minute recording portion is a single magnetic domain.

8. The magnetic recording medium of claim 5, wherein said unit minute recording portions are constructed of any one of Co, Co—Cr, Co—Cr—Ta and Co—Cr—Pt.

9. A magnetic recording medium comprising:

a first layer of a solid non-magnetic material;

recording tracks each having an array of unit minute recording portions of a magnetic material formed directly on said first layer to be embedded in and surrounded by and thereby separated by said first layer, said unit minute recording portions having a higher surface height than said first layer wherein the surface height of said unit minute recording portions is 5 to 30 nm higher than the surface height of said first layer.

10. The magnetic recording medium of claim 9, wherein the surface height of said unit minute recording portions is 10 to 20 nm higher than the surface height of said first layer.

11. The magnetic recording medium of claim 9, wherein each said unit minute recording portion is a single magnetic domain.

12. The magnetic recording medium of claim 9, wherein said unit minute recording portions are constructed of any one of Co, Co—Cr, Co—Cr—Ta and Co—Cr—Pt.

13. The magnetic recording medium of claim 9, wherein said unit minute recording portions having surfaces all at a same height.

* * * * *